United States Patent [19]

Chiyomatsu

[11] Patent Number: 5,060,218
[45] Date of Patent: Oct. 22, 1991

[54] WRITE-ONCE TYPE OPTICAL RECORDING/REPRODUCING DEVICE

[75] Inventor: Nobumitsu Chiyomatsu, Hachioji, Japan

[73] Assignee: Olympus Optical Co., Ltd., Tokyo, Japan

[21] Appl. No.: 272,222

[22] Filed: Nov. 14, 1988

[30] Foreign Application Priority Data

Nov. 16, 1987 [JP] Japan .................. 62-290203

[51] Int. Cl.$^5$ .............. G11B 5/09; G11B 3/90/27/36
[52] U.S. Cl. ........................................ 369/47; 367/48; 367/54; 367/58
[58] Field of Search .................. 369/47, 48, 32, 54, 369/59, 58

[56] References Cited

U.S. PATENT DOCUMENTS

| | | |
|---|---|---|
| 4,426,693 | 1/1984 | Satoh et al. . |
| 4,545,044 | 10/1985 | Satoh et al. ........................ 369/32 |
| 4,587,643 | 5/1986 | Monen et al. ..................... 369/59 X |
| 4,630,252 | 12/1986 | Miura et al. ..................... 369/32 X |
| 4,674,071 | 6/1987 | Okumura et al. . |
| 4,688,203 | 8/1987 | Koishi et al. ........................ 369/48 |
| 4,712,204 | 12/1987 | Takemura et al. ............... 369/47 X |
| 4,815,062 | 3/1989 | Suzuki ................................ 369/48 |
| 4,831,611 | 5/1989 | Sasaki et al. ..................... 369/54 X |
| 4,833,662 | 5/1989 | Yoda .................................. 369/54 X |

Primary Examiner—David Trafton
Assistant Examiner—Tien Ba Pham
Attorney, Agent, or Firm—Frishauf, Holtz, Goodman & Woodward

[57] ABSTRACT

When a record mark portion arranged on the upstream side of a data area is reproduced, the peak value of a reproduction signal of the record mark portion is compared with a reference level. An overwrite preventing circuit is arranged so as to output an inhibiting signal for inhibiting data writing when the comparison output exceeds a predetermined level. With this preventing circuit, a data portion need not be checked in a read mode prior to a write mode.

12 Claims, 4 Drawing Sheets

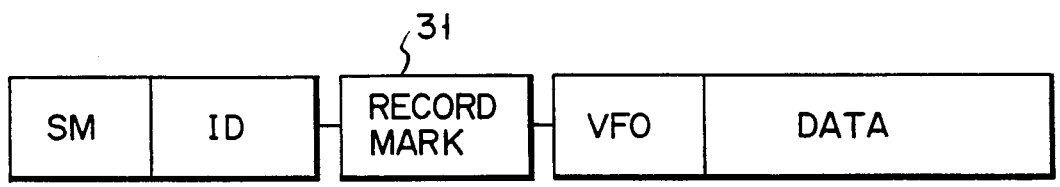
F I G. 2
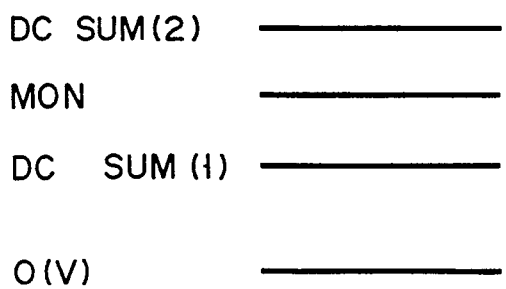
F I G. 3
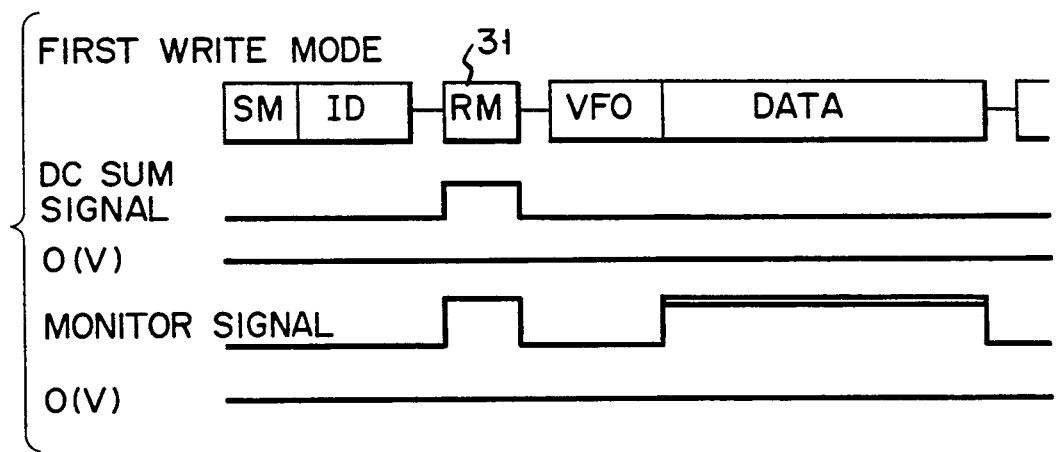
F I G. 4

| TRACK NO. | 0~N | N+1~M | M+1~L |
|---|---|---|---|
| 2-BIT CONVERSION | 0 | 0 | 1 |
| | 0 | 1 | 0 |
| SELECTED SWITCH | S1 | S2 | S3 |

5,060,218

WRITE-ONCE TYPE OPTICAL RECORDING/REPRODUCING DEVICE

BACKGROUND OF THE INVENTION

1. Field of the Invention

The present invention relates to an optical recording/reproducing device having a means for preventing overwriting of data in a recording medium.

2. Description of the Related Art

Recently, a great deal of attention has been paid to an optical recording/reproducing device which can record data in a recording medium at high density or can reproduce data, which is recorded in a recording medium at high density, at high speed, by radiating a light beam.

In the above device, since data is recorded at high density, a light beam must be focused to be sufficiently small for recording and reproduction. For this reason, recording and reproduction are performed by performing focusing control of an objective lens for focusing a light beam on a recording medium while performing tracking control for causing the light beam to follow a current track.

A recording medium utilizing phase change is available.

When data is read from an optical disk utilizing phase change by read power, since the read power is low-level optical power, the optical disk is kept in an amorphous state and has a low reflectivity (or a reflection amount is small). However, if a light beam having high-level write power is radiated onto the optical disk, the amorphous state is phase-changed into crystalline state, and the reflectivity is increased.

Binary data, therefore, can be recorded in such an optical disk by utilizing a difference between these reflection amount levels.

The optical disk utilizing the above-described phase change is of a write-once type in which data can be written in an addition manner. Similar to optical disks of other types, in this write-once type optical disk, when data is written in a data area allowing data to be written therein, overwriting of data in the data area must be prevented. However, a means for efficiently preventing overwriting has not been developed.

SUMMARY OF THE INVENTION

It is an object of the present invention to provide an optical recording/reproducing device which can prevent overwriting, and in which checking in a read mode is not necessary prior to data writing.

In order to achieve the above object, an optical recording/reproducing device having a write power mode and a read power mode, according to the present invention comprises:

a circuit for detecting an optical signal in the write power mode from a record mark portion arranged on an upstream side of a data area in which data is recorded, and generating a reproduction signal corresponding to a recording state of the record mark portion;

a circuit for generating a reference signal;

a circuit for discriminating whether data is already recorded in the data area by comparing the reproduction signal with a reference signal, and generating a discriminating signal;

a circuit for receiving the discriminating signal so as to generate an inhibiting signal for inhibiting overwriting of data in the data area using the write power mode when the discriminating signal represents that data is already recorded in the data area; and a circuit for switching the write power mode to the read power mode in response to the inhibiting signal.

With the above-described arrangement, the device can prevent erroneous overwriting of data in a data portion in which data has been previously recorded. In addition, checking of a data portion in a read mode prior to a write mode becomes unnecessary.

BRIEF DESCRIPTION OF THE DRAWINGS

Other objects and advantages will be apparent from the following description taken in conjunction with the accompanying drawings in which:

FIG. 2 is a view showing a format of a recording track;

FIG. 3 is a view showing conditions for setting the level of a discriminating signal in a recording-state discriminating circuit;

FIG. 4 is a timing chart for explaining an operation of the optical recording/reproducing device of the first embodiment in a first write mode;

DETAILED DESCRIPTION OF THE PREFERRED EMBODIMENTS

Embodiments of the present invention will be described in detail below with reference to the accompanying drawings.

FIGS. 1 to 5 show an optical recording/reproducing device according to a first embodiment of the present invention.

Figure 1:
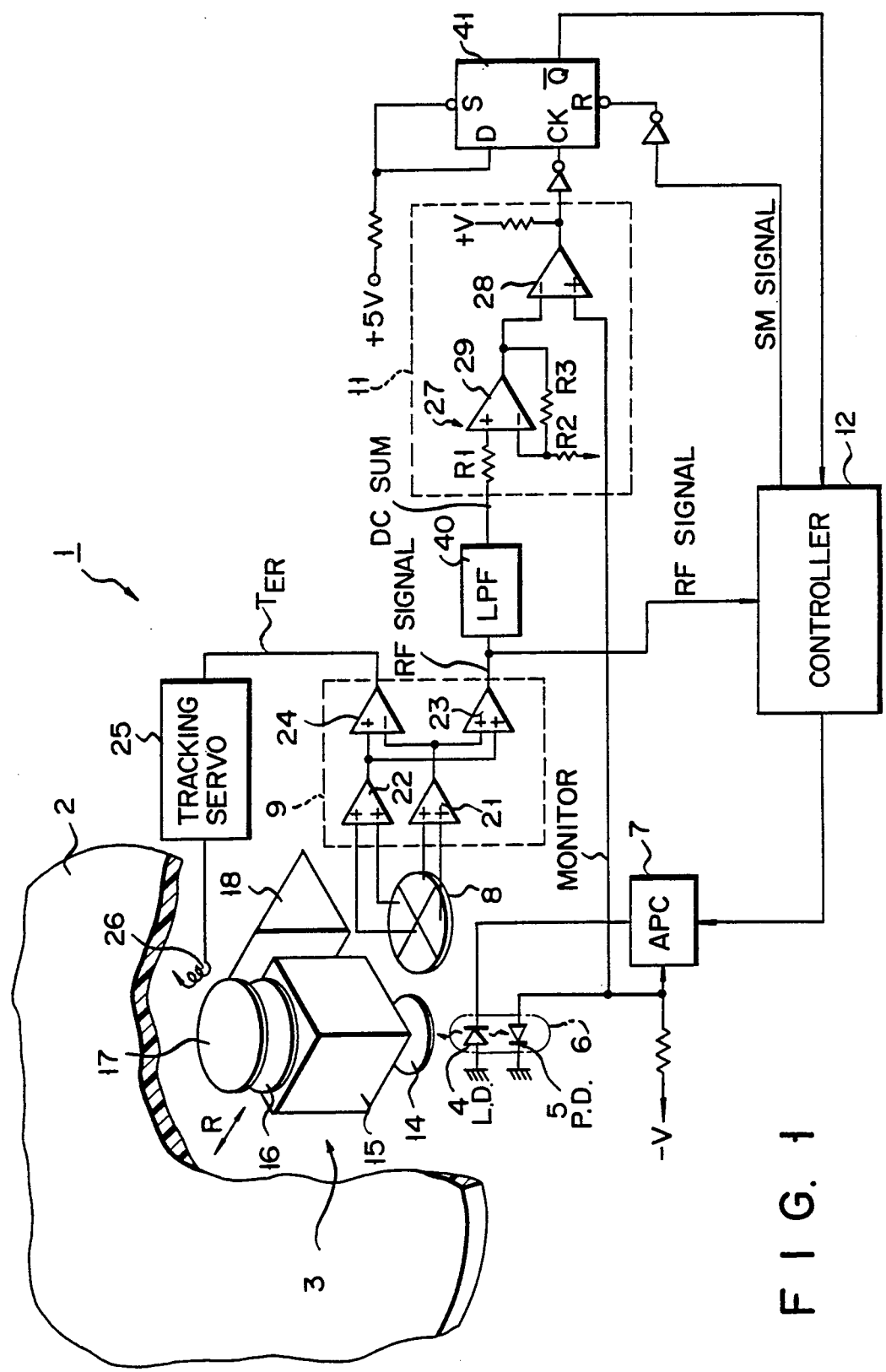
FIG. 1 is a schematic view showing an arrangement of an optical recording/reproducing device according to a first embodiment of the present invention.

As shown in FIG. 1, in optical recording/reproducing device 1 of the first embodiment, optical pickup 3 is arranged so as to oppose phase-change optical disk 2 rotated by a spindle motor (not shown). Optical pickup 3 is can be moved by a driving means such as a VCM (voice coil motor) in the radial direction of a phase-change optical disk (to be simply referred to as an optical disk hereinafter) 2, i.e., direction R crossing concentrical or spiral tracks.

Optical pickup 3 optically records/reproduces data in/from optical disk 2 by using a light beam emitted from laser diode 4. Laser diode 4 is integrally sealed in housing 6 together with, e.g., monitor pin photodiode 5.

Laser diode 4 emits light from its rest surface to monitor photodiode 5. Light emitted from the front surface of laser diode 4 is used for recording or reproduction. Upon reception of the light from the rear surface of laser diode 4 photodiode 5 supplies an optical current corresponding to the received light to APC (auto power control) circuit 7. The emission output of laser diode 4 is automatically controlled to be a proper value by using an output from APC circuit 7.

Photodetector 8 for receiving a light beam reflected by optical disk 2 is constituted by, e.g., four split light-receiving elements. Outputs from these light-receiving elements ar supplied to adding/subtracting circuit 9, and are added to each other so as to be output therefrom as a radio frequency signal (RF signal). The RF signal is input to low pass filter 40, and only a DC component is extracted therefrom, thereby generating a DC SUM signal as a reproduction signal. The DC SUM signal is supplied to recordingstate discriminating circuit 11, which is a main part of the first embodiment, together with a monitor signal from photodiode 5. An output signal from recordingstate discriminating circuit 11 is input to terminal CK of D-type flip-flop (D-FF) 41. An output from D-FF 41 is supplied to controller 12. When this output is set at "L", controller 12 supplies to, e.g., APC circuit 7, a signal for suppressing a current supplied to laser diode 4. As a result, the output from laser diode 4 is inhibited from being set to a write emission level. That is, the output is kept at a read power.

Optical pickup 3 is arranged, for example, in the following manner.

A light beam, e.g., a P-polarized light beam, from laser diode 4 is collimated by collimator lens 14 and is supplied to polarization beam splitter 15. The light beam which is transmitted through polarization beam splitter 15 at substantially 100% transmittance is converted into circular-polarized light by ¼ wave plate 16. Thereafter, the light is focused by objective lens 17 and is radiated onto optical disk 2. The light beam reflected by optical disk 2 is converted into S-polarized light through objective lens 17 and ¼ wave plate 16, is reflected by beam splitter 15 at substantially 100% transmittance, and is incident on critical angle prism 18. The light beam reflected by an inclined surface of critical angle prism 18 is received by photodetector 8 located at a position of a far field. An output signal from photodetector 8 is supplied to adding/subtracting circuit 9. As a result, a DC SUM signal as a reproduction signal is generated by adders 21, 22, and 23, and LPF 40. In addition, tracking error signal TER is generated by adder 21 and subtracter 24. Signal TER is supplied to tracking coil 26 constituting a lens actuator through tracking servo circuit 25. Adding/subtracting circuit 9, tracking servo circuit 25, and tracking coil 26 constitute a tracking servo system. By changing a combination of light-receiving elements subjected to subtraction, a focus error signal is generated by utilizing a critical angle method (not shown).

Recording-state discriminating circuit 11 for detecting whether data is already written in a data area comprises amplifying section 27 for amplifying the DC SUM signal, and comparator 28 for comparing the DC SUM signal amplified by amplifying section 27 with a monitor signal.

The input terminal of amplifying section 27 receiving the DC SUM signal is connected to the non-inverting input terminal of differential amplifier 29 through resistor R1. The inverting input terminal of differential amplifier 29 is grounded through resistor R2 and is connected to the output terminal of differential amplifier 29 through resistor R3. Note that resistors R1 and R2 are set to substantially the same value. With this arrangement, amplifying section 27 amplifies the DC SUM signal, and the amplified signal is compared with the monitor signal by comparator 28, thereby outputting a comparison result.

When a track having a format shown in FIG. 2 is scanned by a light beam, a check signal is output upon comparison between the DC SUM signal for record mark portion 31 and the monitor signal. Recording-state discriminating circuit 11 detects whether data is recorded or not recorded in a data portion (data area) located on the downstream side of record mark portion 31 by using this check signal.

According to the format shown in FIG. 2, each track is divided into a plurality of sectors. Each sector consists of a sector mark (indicated by SM), an ID portion in which an index for identifying a sector is recorded, record mark portion 31, a VFO portion, and a data portion. They are formed in each sector in the order named. Record mark portion 31 may be located on the upstream side of the data portion in the same sector. Note that the VFO portion is an area for allowing a data synchronizer (for synchronizing data asynchronously transferred from the disk with a clock on the controller) to perform a synchronizing operation. Data is written in the VFO portion by a 2-7 code using a pattern of 100100 . . .

The data synchronizer is designed to perform synchronization using a pattern written in the VFO portion.

Since the data portion is formed after the VFO portion, data in the data portion is properly synchronized by a sync signal of the VFO portion so as to be read.

When data is to be recorded in non-recorded data portion, record mark portion 31 is irradiated with a light beam using the write power. Then, the data is written in the data portion. Record mark portion 31 is phase-changed from an amorphous state to a crystalline state upon radiation of the light beam using the write power so that its reflectivity is increased.

Since the radiation period of the light beam using the write power is short, the amorphous state is not completely changed into the crystalline state. Therefore, the reflectivity can be further increased by radiating a light beam using the write power again. That is, if a light beam is radiated using the write power again after radiation of a light beam using the write power is performed, a reflection amount, i.e., the peak value of the DC SUM signal at this portion can be further increased.

The first embodiment utilizes this phenomenon. That is, a relationship between a monitor signal and the DC SUM signal when record mark portion 31 is irradiated with a light beam using the write power is established in recording-state discriminating circuit 11 as shown in FIG. 3.

More specifically, if the peak value of the DC SUM signal when record mark portion 31 is irradiated with a light beam using the write power once is given as DC SUM (1), DC SUM (1) is set to be smaller than signal level MON of the monitor signal. That is, DC SUM (1)<MON. If the peak value of the DC SUM signal when record mark portion 31 is irradiated with a light beam using the write power twice is given as DC SUM (2), signal level MON of the monitor is set to be smaller than DC SUM (2). Therefore, a relationship of DC SUM (1)<MON<DC SUM (2) can be established.

Consequently, when a command for writing data in a data portion is output after data is written in the data portion once, record mark portion 31 is irradiated with a light beam using the write power twice. As a result, a check signal from recording-state discriminating circuit 11 is set at "L", and circuit 11 outputs a detection signal representing overwriting. In response to this signal, controller 12 immediately outputs a command for inhibiting data writing using the write power to APC circuit 7, thereby preventing overwriting of data in the data portion.

An operation of the first embodiment will be described below with reference to FIGS. 4 and 5.

When each track of optical disk 2 has the format shown in FIG. 2, the DC SUM and monitor signals are changed in a first write mode, as shown in FIG. 4.

Since the output signal from recording-state discriminating circuit 11 is set at "H" and is a discriminating signal not representing overwriting, data is written in a data portion.

If a command for recording data in the data portion in which the data is written once is erroneously output, record mark 31 is irradiated with a light beam using the write power. In this case, the peak value of the DC SUM signal exceeds peak value level MON of the monitor signal as shown in FIG. 5. Recording-state discriminating circuit 11 detects this, and its output level is set at "L". The output from circuit 11 is supplied to terminal CK of D-FF 41.

Figure 5:
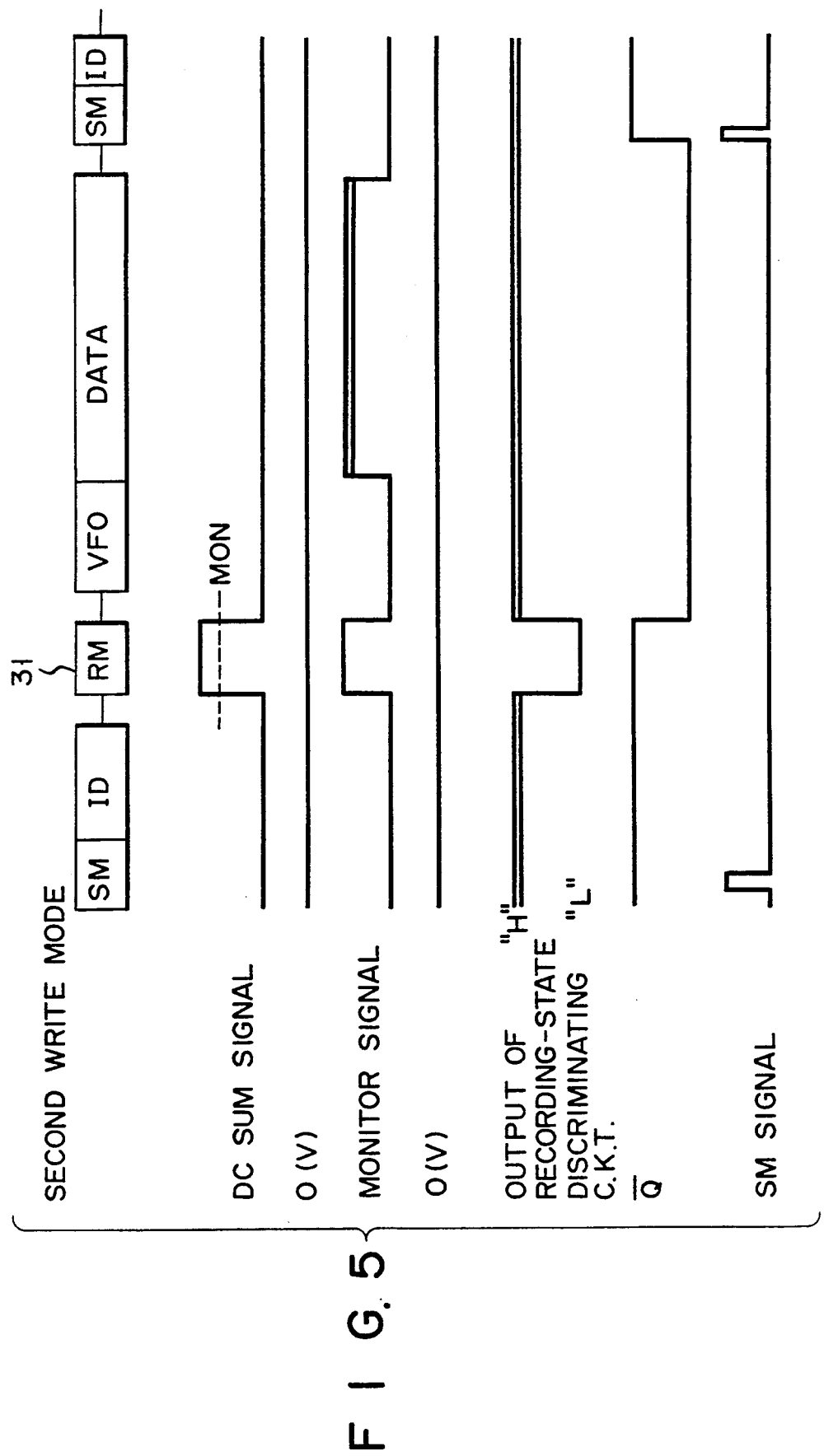
FIG. 5 is a timing chart for explaining an operation of the optical recording/reproducing device of the first embodiment in a second write mode.

As shown in FIG. 5, D-FF 41 normally outputs a signal of "H" level to the $\bar{Q}$ terminal. In this case, a laser emission output is switched from a write level to a read level in accordance with a normal control operation of controller 12, and is switched to the write level at the data portion so as to perform data write. Such a control operation is generally performed as disclosed in, e.g., U.S. Pat. Nos. 4,426,693 and 4,674,071.

When the DC SUM signal exceeds peak value MON at record mark portion 31, and recording-state discriminating circuit 11 detects the necessity of inhibiting data write in the data portion, the output of comparator 28 is lowered to "L" level to change the $\bar{Q}$ terminal of D-FF 41 to "L" level. When the signal of "L" level from the $\bar{Q}$ terminal of D-FF 41 is supplied to controller 12, controller 12 performs a control operation for inhibiting output of an emission command at the write level to the laser. That is, an AND gate for the output from the $\bar{Q}$ terminal and the emission command is arranged in controller 12. An output from the AND gate becomes an inhibiting signal for inhibiting overwriting of data in a data area. For example, in U.S. Pat. No. 4,674,071, a signal representing a data area and an output from the $\bar{Q}$ terminal may be ANDed. In U.S. Pat. No. 4,426,693, a write enable signal and an output from the $\bar{Q}$ terminal may be ANDed.

As shown in FIGS. 1 and 5, D-FF 41 is reset by a sector mark (SM signal) representing the start of each sector and separated by an RF signal.

As described above, when signal "L" is supplied to controller 12, controller 12 immediately outputs a command for inhibiting data writing in a data portion to APC circuit 7. As a result, a current flowing through laser diode 4 is held at the read power. This prevents overwriting of data in a data portion located on the downstream side of record mark portion 31 in the same sector.

According to the first embodiment by simply determining whether an amount of light reflected by record mark portion 31 located on the upstream side of each data portion exceeds a reference level, it can be discriminated whether data is recorded or not in the record portion on the downstream side. Therefore, even if a write command is erroneously output, overwriting of data in a data portion in which data is previously recorded can be prevented.

According to the first embodiment, since over-writing can be prevented when a write command is output, a data portion need not be scanned in a read mode prior to a write operation to check whether data is recorded in the data portion or not by using a signal level upon scanning. Therefore, the write operation can be completed within a short period of time.

Since the DC SUM signal corresponding to an amount of light reflected by record mark portion 31 is compared with the monitor signal in the first embodiment, a reference level can be changed in accordance with a change in write power. With this operation, if, for example, the write power is changed in accordance with a difference in linear velocity between the inner and outer peripheral tracks, the reference level can be changed in accordance with a change in write power. Therefore, even if a linear velocity varies, a decision whether data is recorded or not can be made.

Figures 6, 7:
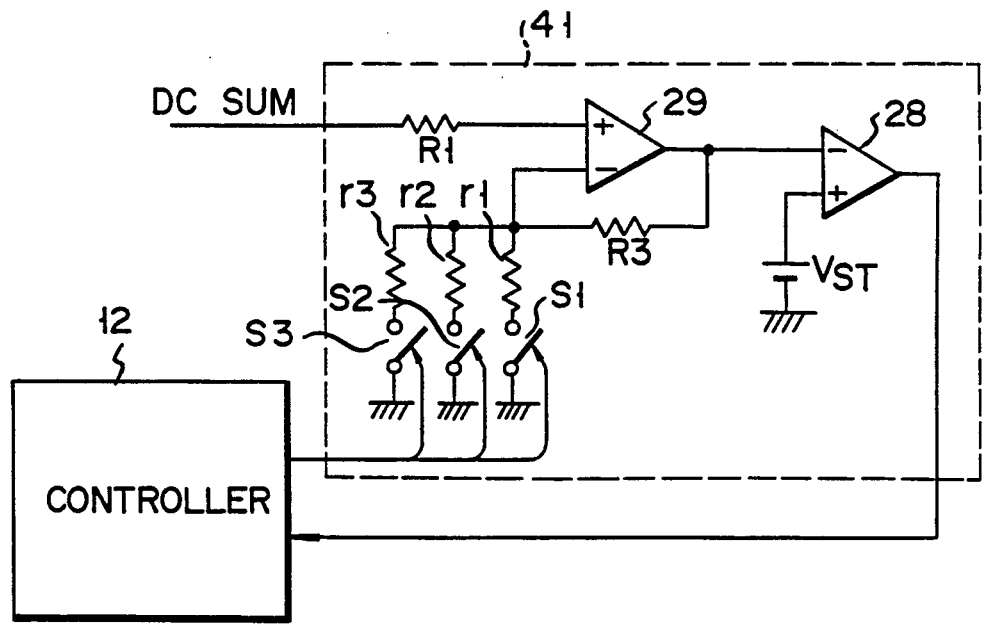
FIG. 6 is a circuit diagram of a recording-state discriminating circuit according to a second embodiment of the present invention.
FIG. 7 is a view for explaining selection of switches S1, S2, and S3 with respect to track Nos.

FIG. 6 shows recording-state discriminating circuit 41 according to a second embodiment of the present invention.

In the second embodiment, a reference level is set to be constant voltage VST, and an amplification factor of the DC SUM signal is variably controlled by controller 12. That is, a plurality of resistors ri and switches Si ($i=1, 2, 3$) are used in place of resistor R2. Switches Si are ON/OFF-controlled by a control signal from controller 12 so that the amplification factor $(ri+R3)/ri$ of amplifier 29 is variably controlled.

For example, controller 12 reads an address from an ID portion of a sector of a predetermined track, and recognizes it as a current address. Subsequently, controller 12 selects a switch and obtains an optimal amplification factor in accordance with the address and on the basis of a 2-bit conversion table in FIG. 7.

According to the second embodiment, controller 12 selects/sets an amplification factor in accordance with a sector of a track for which a write command is performed. In addition, when a track No. is to be changed, the influences on laser diode 4 can be taken into consideration. Therefore, the same function as in the first embodiment can be obtained. Furthermore, the second embodiment can cope with a case wherein optimal conditions for determining whether data is recorded or not in the inner and outer peripheral tracks are deviated from those in the first embodiment. Moreover, even if optical disk 2 varies in quality, this variation can be compensated for by changing an amplification factor.

Note that the reference voltage side may be changed in FIG. 6. In the first embodiment, the amplification factor of amplifying section 27 may be changed. In addition, in FIG. 6, the amplification factor may be fixed to simplify the arrangement.

A decision whether data is recorded or not can be made in synchronism with only the period of the DC SUM signal when it is reflected by record mark portion 31. However, when output signal "L" is output in the sector period in addition to the above period, recording may be inhibited within the corresponding sector.

When signal "L" is detected, an alarm means may alarm that an overwrite command is output.

The present invention is not limited to optical pickup 3 having the arrangement shown in FIG. 1. In addition, the present invention not limited to a device utilizing light emitted from the rear surface for the monitor signal. A portion of light emitted from the front surface may be utilized.

In the above described embodiments, the reflectivity is increased by phase change. However, the present invention can be easily applied to a case wherein the reflectivity (or reflection amount) is decreased by phase change.

What is claimed is:

1. An optical recording/reproducing device having a write power mode and a read power mode, comprising:
   means for detecting an optical signal in the write power mode from a record mark portion arranged on an upstream side of a data area in which data is recorded, and generating a reproduction signal corresponding to a recording state of said record mark portion;
   means for generating a reference signal;
   means for receiving said reproduction signal and said reference signal, and discriminating whether data is already recorded in said data area by comparing the reproduction signal with a reference signal, and generating a discriminating signal;
   means for receiving the discriminating signal so as to generate an inhibiting signal for inhibiting overwriting of data in said data area if in the write power mode when the discriminating signal represents that data is already recorded in said data area; and
   means for switching from the write power mode to the read power mode in response to the inhibiting signal generated when in the write power mode.

2. The device according to claim 1, wherein said means for generating the discriminating signal includes:
   means for amplifying the reproduction signal and generating an amplified signal; and
   means for comparing the amplified signal with the reference signal.

3. The device according to claim 1, wherein said means for generating the discriminating signal includes:
   means for amplifying the reproduction signal at an arbitrary amplification factor; and
   means for comparing the amplified signal with the reference signal.

4. The device according to claim 1, wherein said means for generating the reference signal includes:
   means for supplying a light beam onto said record mark portion; and
   means for receiving the light beam and generating the reference signal.

5. The device according to claim 1, wherein the reference signal is fixed.

6. The device according to claim 1, wherein the reference signal is changed in accordance with level of a write power in the write power mode.

7. The device according to claim 1, wherein a level of the optical signal is changed upon phase change of a material constituting each record mark.

8. The device according to claim 7, wherein the optical signal is variable in accordance with a change in reflectivity of said record mark portion.

9. An optical recording/reproducing device having a write power mode and a read power mode, comprising:
   means for detecting an optical signal in the write power mode from a record mark portion arranged on an upstream side of a data area in which data is recorded, and generating a first reproduction signal corresponding to a recording state of said record mark portion;
   low-phase filter means for receiving said first reproduction signal and extracting a low frequency component from said first reproduction signal and generating a second reproduction signal;
   means for generating a reference signal;
   means for receiving said second reproduction signal and said reference signal, and discriminating whether data is already recorded in said data area by comparing the second reproduction signal with the reference signal, and generating a discriminating signal;
   means for receiving the discriminating signal so as to generate an inhibiting signal for inhibiting overwriting of data in said data area if in the write power mode when the discriminating signal represents that data is already recorded in said data area; and
   means for switching from the write power mode to the read power mode in response to the inhibiting signal generated when in the write power mode.

10. The device according to claim 9, wherein said second reproduction signal is controlled so that an amplification factor thereof is variably controlled.

11. The device according to claim 9, wherein said means for generating the discriminating signal includes:
    means for amplifying the second reproduction signal at an variably controlled amplification factor in accordance with a sector of the record mark portion and generating an amplified signal; and
    means for comparing the amplified signal with the reference signal.

12. The device according to claim 1, wherein said means for generating the discriminating signal includes:
    means for amplifying the reproduction signal at a variably controlled amplification factor in accordance with a sector of the record mark portion, and for generating a corresponding amplified signal; and
    means for comparing the amplified signal with the reference signal.

* * * * *